United States Patent [19]

Stanley

[11] 3,963,286

[45] June 15, 1976

[54] ANTIFRICTION ROLLER BEARING

[76] Inventor: Richard B. Stanley, 4 Coventry on Duxbury, Rolling Meadows, Ill. 60008

[22] Filed: Mar. 11, 1974

[21] Appl. No.: 449,699

[52] U.S. Cl. ............................... 308/205; 308/202; 308/215
[51] Int. Cl.² .................... F16C 19/00; F16C 13/00
[58] Field of Search ........... 308/174, 212, 205, 202, 308/213, 214, 215; 29/110, 122, 148.4 A, 148.4 D

[56] References Cited
UNITED STATES PATENTS

| | | | |
|---|---|---|---|
| 1,490,688 | 4/1924 | Whitney | 308/215 |
| 1,510,920 | 10/1924 | Bronander | 308/212 |
| 1,528,363 | 3/1925 | Bronander | 73/403 |
| 1,930,190 | 10/1933 | Becker | 308/215 |
| 2,251,555 | 8/1941 | Schermer | 308/215 |
| 2,266,888 | 12/1941 | McCurdy et al. | 308/216 |

Primary Examiner—M. H. Wood, Jr
Assistant Examiner—Richard A. Bertsch
Attorney, Agent, or Firm—Mann, Brown & McWilliams

[57] ABSTRACT

An antifriction roller bearing having a bearing assembly comprising an outer race, an inner race, and rolling bearings interposed between said races, in which assembly the rolling bearings each comprise a roller having its ends in thrust and load transmitting engagement with the outer race, which rollers are also in thrust and load transmitting relation to the inner race intermediate the ends of said rollers. The area of engagement of said rollers with said inner race at least equals the area of engagement of said rollers with the outer race.

5 Claims, 5 Drawing Figures

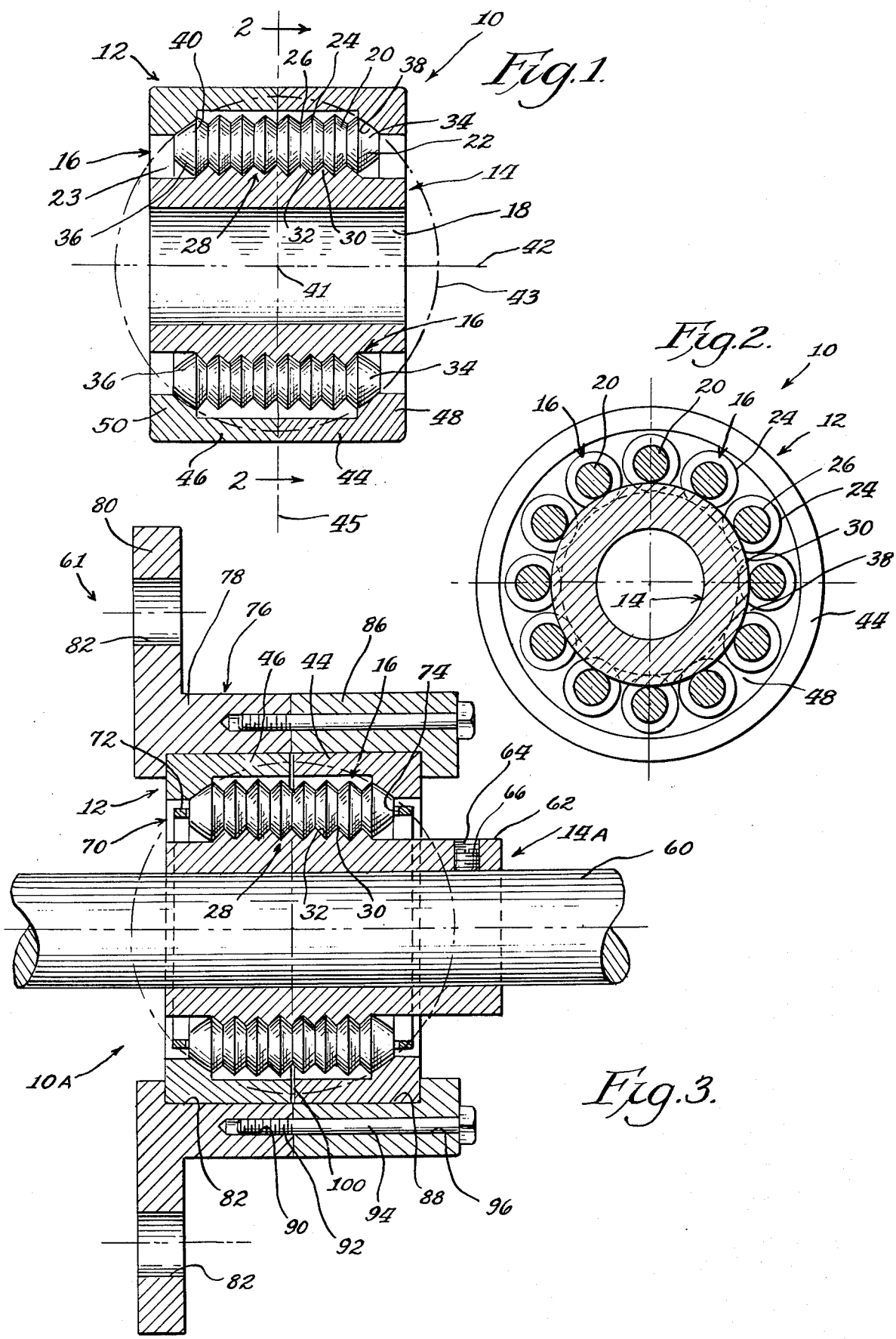

ANTIFRICTION ROLLER BEARING

This invention relates to antifriction bearings, and more particularly to antifriction bearings of the roller bearing type adapted to handle both radial and thrust loads.

Conventional bearings of the ball and roller type individually have the well known inherent limitation in the loads they will carry due to the point or line contact the rolling elements involved have with the bearing raceway surfaces. However, the applicant's analysis of bearing load limitations have made it evident that there is another important load limiting factor that apparently has not been considered in bearing design. This is that the bearing assembly about its outer diameter (the locus of the points or lines of engagement of the rolling bearings with the bearing outer race) can withstand and transmit 15 to 20 times more unit pressure than at the internal diameter of the bearing (the locus of the points or lines of engagement of the rolling bearing with the bearing inner race). This is because in the case of the outer diameter of the bearing, convex surfaces of the rolling bearings are rolling on a concave raceway surface, which in practice adds up to a significantly greater area of contact than at the inner diameter of the bearing, where convex surfaces of the rollers are riding on a convex inner raceway surface.

A principal object of this invention is to provide an antifriction roller bearing assembly of a significantly increased capacity by arranging it so that the area of engagement between the rolling bearings and the inner race is equal to that of the rolling bearings with the bearing unit outer race.

Another principal object of the invention is to provide a roller bearing adapted to handle thrust loads in either direction while requiring only a single row of bearing rollers about the inner race.

Other important objects of the invention are to provide a roller bearing inner and outer race assembly that is internally self-aligning, that is of few and simple parts, and that is economical of manufacture, convenient to assemble and install, and long lived in operation.

In accordance with the invention, a roller bearing inner and outer race assembly is provided in which a single row of rollers having their shanks formed with alternating right flanges and grooves rides on an inner raceway surface of like contour, with the ends of the rollers being formed with bearing surfaces that are of spherical contour for riding on correspondingly contoured raceway surfaces on the outer race. The area of engagement of the rollers with the inner raceway is made at least equal to the engagement of the rollers with the outer raceways. The flanges and grooves of the rollers and inner raceway are 45 degree angled for optimum load transmittal characteristics. The resulting bearing assembly may be incorporated in flange, pillow block and other type bearings to form rolling bearing units.

The result is that the basic weakness of conventional roller bearing units is overcome by increasing the area of engagement of the rollers and the inner race about the inner diameter of the bearing to at least equalization with the area of engagement of the rollers and the outer race about the outer diameter of the bearing. Furthermore, thrust loads acting in either direction can be handled by the bearing assembly utilizing a single row of rollers.

Other objects, uses and advantages will be obvious or become apparent from a consideration of the following detailed description and the application drawings, wherein like reference numerals indicate like parts throughout the several views.

In the drawings:

FIG. 1 is a diagrammatic sectional view along the axial center of a diagrammatically illustrated bearing assembly illustrating the basic features of this invention;

FIG. 2 is a sectional view taken substantially along line 2—2 of FIG. 1;

FIG. 3 illustrates a flange type bearing unit employing the principles of this invention;

Figure 4:
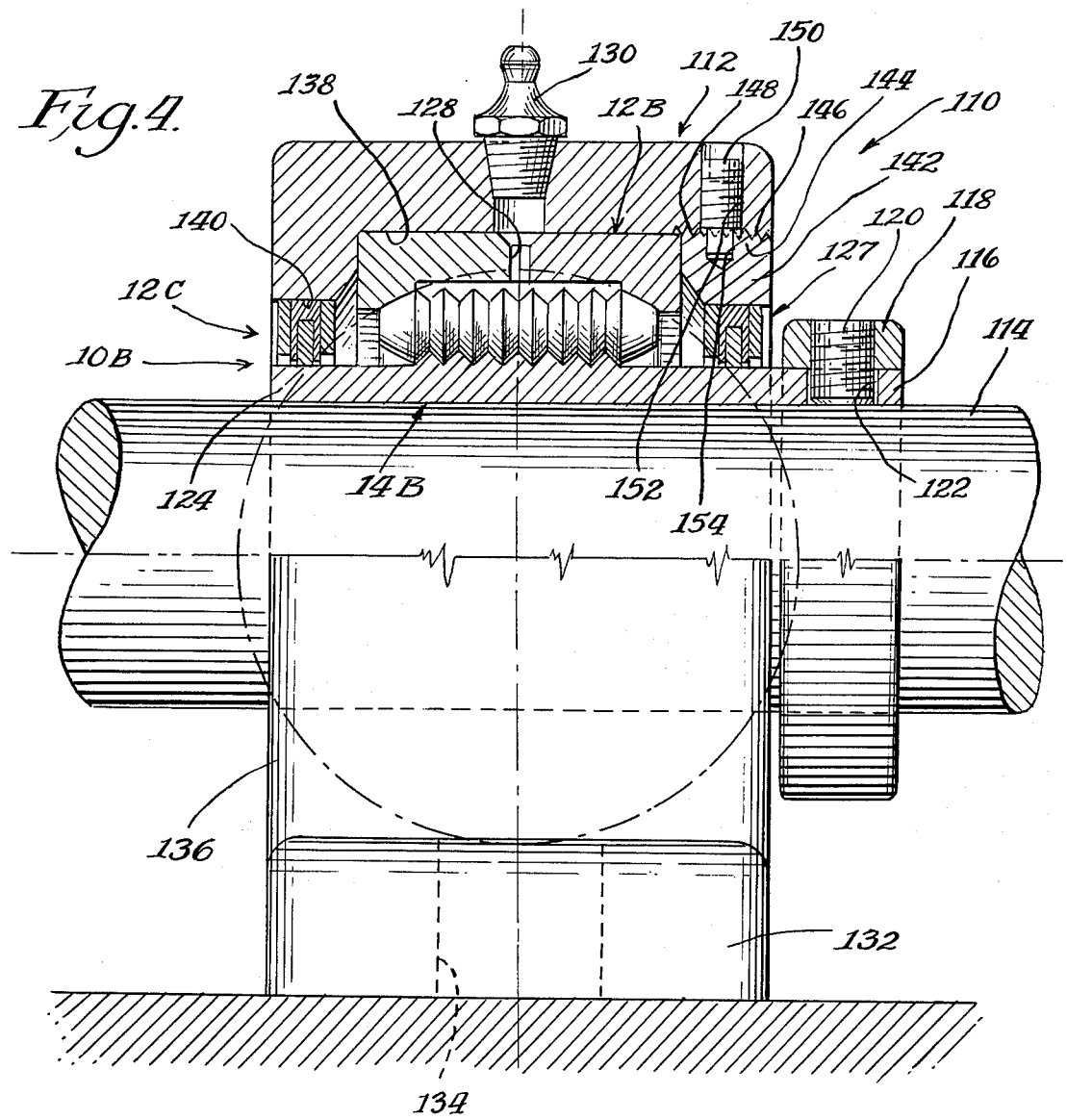
FIG. 4 illustrates a pillow block type bearing unit employing the principles of this invention.

However, it is to be distinctly understood that the specific drawing illustrations provided are supplied primarily to comply with the requirements of the Patent Laws, and that the invention is susceptible of other embodiments that are intended to be covered by the appended claims.

Referring first to the diagrammatic illustrations of FIGS. 1 and 2, reference numeral 10 generally illustrates a largely diagrammatically illustrated bearing assembly of the roller type in which the basic features of this invention are incorporated, wherein it is shown that the basic bearing assembly of this invention comprises an outer race 12, an inner race 14, and rollers 16 interposed between the inner and outer races.

The inner race is of the usual annular construction defining bore 18 that receives the shaft to which the inner race is applied. Details such as roller spacers, seals, and devices for locking the inner race to the shaft are omitted for simplicity of illustration insofar as diagrammatic FIGS. 1 and 2 are concerned.

In accordance with this invention, the area of engagement of the rollers 16 with the inner race is at least equal to the area of engagement of the rollers with the outer race.

This is achieved, in accordance with this invention, by forming the shank 20 of the individual rollers 16, intermediate the ends 22 of the rollers, with alternating right flanges 24 and the right grooves 26 which ride on annular raceway 28 that is of like contour. That is, the inner raceway also defines alternating right flanges 30 and right grooves 32 about the external diameter of the inner race. These flanges and grooves are disposed at right angles to the longitudinal axes of the respective rollers and inner race, and thus are appropriately termed "right" in character.

As indicated in FIG. 1, the grooves and flanges of the rollers and inner race are substantially complemental in configuration, and are shaped and angled at 45° in a manner similar to 45° angle screw threading of the standard V type.

Furthermore, the ends 22 and 23 of the rollers are formed with spherically contoured bearing surfaces 34 and 36 that ride on correspondingly contoured raceway surfaces 38 and 40 of the outer race, with the outer race surfaces 38 and 40 thus defining the raceway of the outer race 12 in spaced apart sections. The spherical contour of surfaces 34, 36, 38 and 40 conform to that obtained by arcuate surfacing struck on a radius about a center 41 lying on the longitudinal axis 42 (and thus the axial center or bearing axis) of the bearing, as represented by circle 43. The contour of surfaces 38 and 40 may also be considered to be defined by surfaces of revolution (about axis 42) that are smoothly contoured longitudinally of the bearing axis 42. In the form shown, center 41 is also located at the longitudinal midpoint of the bearing, as represented by transverse axis line 45.

In the form shown, the outer race 12 is of two part construction, comprising a pair of ring members 44 and 46 that are respectively shouldered at 48 and 50 to provide for formation of the respective spherically contoured outer raceway surfaces 38 and 40.

In the diagrammatic form shown in FIGS. 1 and 2, sufficient rollers 16 are employed to substantially fill the space between the inner and outer races between these two components with a single row of the bearing elements 16, with no spacer component being employed. However, this is optional as where strict spacing between rollers is desired, a conventional roller spacer, shaped to accommodate the special shaping of the rollers 16, may be employed.

As indicated, the area of engagement of the rollers 16 with the inner race, about the raceway 28, which thus forms the inner or internal diameter of the bearing, is at least equal to the area of engagement between the rollers 16 and the outer raceway surfaces 38 and 40, which gives the bearing assembly a unit pressure load capacity at its inner diameter which is at least equal to that at its outer diameter, thereby significantly increasing the load bearing capacity of the bearing assembly 10.

Furthermore, the oblique positioning of the roller bearing surfaces 34 and 36 and the outer raceway surfaces 38 and 40 with which they cooperate, relative to the longitudinal axes of the rollers, and the flanged nature of the rollers 16 and inner raceway 28, enable the bearing unit to take thrust loads acting in either direction. It will also be apparent that only a single row of the rollers 16 is required for this purpose.

The spherical contour of surfaces 34, 36, 38 and 40 makes bearing assembly 10 internally self-alighning, thus eliminating the need to swivably mount bearing assembly 10 where self-alignment is desired.

The 45° angulation of the flanges and grooves of the rollers 16 and inner raceway 28 provides for equal application of the components of thrust loads radially and longitudinally of the bearing.

Assembly of the bearing assembly is simple; it requires application of one of the outer race sections 44 or 46 about the inner race 14, with the individual rollers 16 then being applied therebetween and the second outer race section slipped into place over the protruding ends of rollers 16. Outer race sections 44 and 46 then may be suitably secured together, as by employing suitable fastening devices, such as screws, external clamps, or the like, or the mounting of the bearing assembly 10 in its housing, such as those suggested in FIGS. 3 and 4, will service this purpose.

While outer race 12 is shown round in configuration in the drawings, it may be of quadrilateral external shape, though the internal surfacing of same will be rounded as indicated in the drawing.

Referring now to the bearing unit 61 of FIG. 3, which diagrammatically illustrates the application of the principles of this invention to a flange type bearing unit, the inner race 14A of bearing assembly 10A is shown applied to a shaft 60 and has one end of same extended as at 62 and formed with a threaded opening 64 that receives set screw 66 which is turned into engagement with the shaft 60 for fixing the inner race 14A to the shaft.

The inner race 14A is formed with raceway 28, including its right flanges 30 and right grooves 32. The outer race 12 is the same as shown in FIG. 1 and the outer and inner races have the rollers 16 interposed therebetween in a manner indicated in FIG. 1, except that in the case of the bearing unit 10A, a roller spacer 70 is employed that is of a more or less conventional arrangement, and comprises a ring 72 formed to define roller receiving openings 74 therein that receive the respective rollers for spacing them as desired about the inner race 14A.

The bearing assembly 10A is mounted in flange type bearing housing 76, to complete the bearing unit 61. The housing 76 comprises a base portion 78 that is flanged as at 80 for formation of the usual bolt receiving holes 82, and that is socketed as at 82 to receive the bearing assembly 10A.

The flange type housing 76 also includes a cover portion 86 that is socketed as at 88 to receive the bearing assembly 10A. The housing base portion 76 is formed with threaded openings 90 to receive the threaded ends 92 of suitable bolts 94 applied to the corresponding bolt receiving openings 96 of the housing cover portion 76 for securing the bearing assembly 10A within the housing 76.

In practice, the outer race sections 44 and 46 may be so formed that when the outer raceway surfaces 38 and 40 are firmly seated against the bearing surfaces 34 and 36 of the roller 16, the outer race sections 44 and 46 are slightly spaced apart, as indicated at 100 in FIG. 3. This is to insure that the outer raceway surfaces 38 and 40 are firmly seated against the bearing surfaces 34 and 36 of the rollers for good force transmitting relation thereto.

The bearing unit 61 may be employed to mount shaft 60 in conventional flange type mounting arrangements, and the internal self-alignment of assembly 10A accommodating shaft misalignment with significant increase in the load capacity of the bearing. Of course, suitable seals and the like may be employed as desired.

Referring now to FIG. 4, reference numeral 110 generally indicates a pillow block type roller bearing unit in which bearing assembly 10B of the type contemplated by this invention is incorporated in a conventional pillow block housing 112 for the purposes of journaling shaft 114.

As indicated in the drawing, the inner race 14A has its end 116 extended for application thereto of locking ring 118 and the said set screw 120 thereof, which is received through the opening 122 formed in the inner race, for the purpose of locking the inner race to the shaft 114. The other end 124 of the inner race is also extended for applicaton between the housing 112 and the inner race of a suitable seal device 126.

The outer race 12B will be the same as the outer race 12 except that it is formed with a suitable lubricant passage 128 for receiving lubricant from conventional lubricant fitting 130 that forms a part of the housing 112.

The housing 112 is of the usual pillow block construction defining oppositely directed lugs 132 (only one is shown) that are formed with the usual bolt receiving openings 134 and integral wall structure 136 which is shaped to define the bearing chamber 138 that is open at either end of the housing. The seal 126 is mounted in the narrower housing end opening 140, and when the bearing assembly 10B has been applied to the bearing chamber 130 in the manner indicated in FIG. 4, closure ring 142 that is externally threaded as at 144 for cooperation with internal threading 146 of the housing formed in the larger housing end opening 148 is applied to the end opening 48 against the outer race to seat the outer race raceway surfaces 38 and 40 against the respective bearing surfaces 34 and 36 of the rollers.

The closure ring 142 is equipped with a suitable seal 127 that is similar to seal 126. The housing 112 has a dog point set screw 150 applied to its threaded opening 152 for cooperation with the opening 154 of the closure ring 142 to key the closure ring 142 against unthreading movement due to vibration and the like.

It will therefore be seen that this application provides a bearing unit in which the unit pressures applicable to the bearing internal diameter are at least equalized with those applied to the outer diameter, thereby significantly increasing the load bearing capacity of the bearing unit.

The 45° angulation of the roller and inner race flanges and grooves is the optimum angle for advantageous application of thrust forces to the bearing. At this angle, thrust forces are equally divided between laterally and radially acting components for uniform stress application to the bearing.

Figure 5:
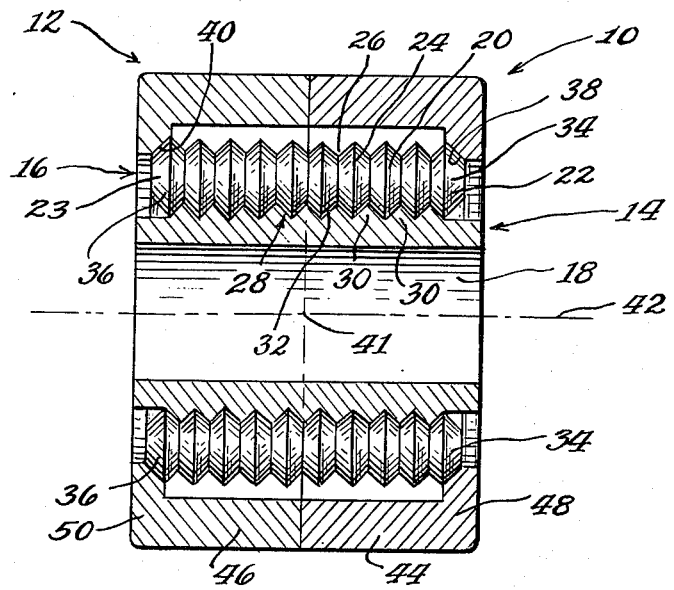
FIG. 5 is a view similar to that of FIG. 1, but illustrating a modified form of the invention.

While the spherical contour of the roller ends 34 and 36 and outer race raceway surfaces 38 and 40 is preferred, the surfaces may also be at 45° angles where internal self-alignment of the bearing is not desired, as illustrated by the showing of FIG. 5, wherein the bearing surfaces 34C and 36C of rollers 16C, and raceway surfaces 38A and 40A of outer race 12C are of complementing 45° angulation.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a rolling bearing assembly defining a bearing axis and including an inner race, an outer race disposed about the inner race and concentric with the bearing axis, and a plurality of rolling bearings interposed between the inner and outer races, with the rolling bearings each comprising an elongate roller defining a shank intermediate the ends thereof, the improvement wherein:

the inner race is formed to define an inner raceway thereabout, said inner raceway and said shanks of said rollers being formed to define right flanges and right grooves in interfitting relation forming the areas of rolling engagement of the rollers with the inner race raceway, said outer race defining an outer raceway thereabout on which said rollers ride in rolling engagement therewith and having its raceway surfacing of circular contour transversely of the bearing axis and across the area of same that is engaged by said rollers, with said outer raceway surfacing area being a surface of revolution that is smoothly contoured axially of the bearing assembly, and with the area of engagement of said rollers with said inner race at said inner raceway being at least equal to the area of engagement of said rollers with said outer race outer raceway.

2. In a rolling bearing unit defining a bearing axis and including an inner race, an outer race disposed about the inner race and concentric with the bearing axis, and rolling bearings interposed between said races in load transmitting relation thereto, the improvement comprising:

said outer race defining a raceway thereabout having a pair of thrust resisting surfaces spaced apart axially of said bearing, said rolling elements each comprising a roller having a shank defining adjacent either end of same a bearing surface that is angled relative to the axis of the roller, which bearing surfaces of the respective rollers ride on the respective outer raceway surfaces in force transmitting relation thereto, said outer race thrust resisting surfaces being of circular contour transversely of the bearing axis and across the area of same that is engaged by said rollers, with said areas of said outer race thrust resisting surfaces each being a surface of revolution that is smoothly contoured axially of the bearing assembly, said inner race being formed to define a raceway thereabout, said inner race raceway and said rollers intermediate said roller ends being formed to define right flanges and right grooves in interfitting relation forming the areas of rolling engagement of the rollers with the inner race raceway, with the area of contact of said rollers and inner race raceway being at least equal to the area of contact of said roller bearing surfaces and said outer raceway thrust resisting surfaces.

3. The improvement set forth in claim 2 wherein:

said rollers are free of engagement with said outer race intermediate the ends of said rollers.

4. The improvement set forth in claim 3 wherein:

said rollers are each of one piece construction and form a single row of rolling bearings about said inner race between said outer race surfaces, with said rollers being free of geared interconnection with said races and each other.

5. The improvement set forth in claim 2 wherein:

said flanges and grooves are in alternating relation axially of the bearing assembly.

* * * * *